Jan. 20, 1953 K. M. WATSON 2,626,205
GRAVITY BED REACTOR
Filed Nov. 16, 1945 11 Sheets-Sheet 3

INVENTOR
KENNETH M. WATSON
BY
Pennie, Davis, Marvin & Edmonds
ATTORNEYS

Jan. 20, 1953 — K. M. WATSON — 2,626,205
GRAVITY BED REACTOR
Filed Nov. 16, 1945 — 11 Sheets-Sheet 4

INVENTOR
KENNETH M. WATSON
BY Pennie, Davis, Marvin & Edmonds
ATTORNEYS

Jan. 20, 1953

K. M. WATSON

2,626,205

GRAVITY BED REACTOR

Filed Nov. 16, 1945

INVENTOR
KENNETH M. WATSON
BY
Pennie, Davis, Marvin & Edmonds
ATTORNEYS

Jan. 20, 1953 K. M. WATSON 2,626,205
GRAVITY BED REACTOR
Filed Nov. 16, 1945 11 Sheets-Sheet 10

INVENTOR
KENNETH M. WATSON
BY
Pennie, Davis, Marvin & Edmonds
ATTORNEYS

Jan. 20, 1953  K. M. WATSON  2,626,205
GRAVITY BED REACTOR
Filed Nov. 16, 1945  11 Sheets-Sheet 11

INVENTOR
KENNETH M. WATSON
BY
Pennie, Davis, Marvin & Edmonds
ATTORNEYS

Patented Jan. 20, 1953

2,626,205

UNITED STATES PATENT OFFICE 2,626,205

GRAVITY BED REACTOR

Kenneth M. Watson, Madison, Wis., assignor to Sinclair Refining Company, New York, N. Y., a corporation of Maine Application November 16, 1945, Serial No. 629,091

1 Claim. (Cl. 23—288)

This invention relates to improvements in the catalytic cracking of hydrocarbons and more especially to improvements in cracking operations in which a granular catalyst is moved downwardly through a region of reaction in a reaction vessel, between a level of introduction and a lower level of discharge. In these operations uniform and regular flow of the granular catalyst between the two levels throughout the region of reaction is essential for maximum efficiency and economy. Thus, if part of the catalyst flows through the region of reaction more rapidly than other parts, catalyst exposure is not uniform and catalyst efficiency drops, while if the catalyst flow is irregular the catalyst undergoes physical degradation with production of fines necessitating increased catalyst replacement. In operations in which the catalyst circulates between a cracking reactor and regenerating kiln, the effects of non-uniformity or irregularity are not confined to the reaction vessel in which it occurs. For example, non-uniform flow in the cracking reactor may involve non-uniformity of coke deposit resulting from the cracking reaction, in turn involving irregularities in the regenerating kiln in which such coke deposits are burned from the catalyst.

In the conventional catalytic cracking system employing a moving catalyst bed, uniform and regular flow of the catalyst in the cracking reactor and regenerator is sought to be attained by providing, in conjunction with vertical catalyst distributing tubes in the upper part of each vessel, a series of apertured collector plates or baffles in the lower part of the vessel, the lowest of the baffles having the fewest apertures and each above having more than the next below, the apertures in each baffle being provided with downcomer pipes or tubes and being arranged with respect to the apertures in the next lower baffle or the discharge port in the lower end of the vessel (in the case of the lowest baffle) so that the several paths of flow through the apertures in the highest baffle are eventually gathered in a single path of flow through the discharge port. Additional to the baffles and the vertical catalyst distributing tubes, the cracking reactor and regenerating kiln each comprises a plurality of transverse beam ducts positioned intermediate the tubes and baffles, such ducts serving for the introduction of oil vapors or steam in the case of the cracking reactor and for the introduction of air or removal of combustion gases in the instance of the regenerating kiln. Associated with each duct and extending at right angles thereto on either side on the same plane are a plurality of distributor or collector members. These members have the form of inverted troughs, and adjacent troughs form channels through which the downwardly flowing granular catalyst passes.

While it would seem that uniform and regular flow could be developed with the arrangement of distributing tubes and baffles described, in actual operation this desideratum is seldom approached.

In considering ways to promote more uniform and regular flow of catalyst through the cracking reactor and regenerator, it occurred to me that the irregular or intermittent flow, also the non-uniformity of flow across the vessels, might be due at least in part to bridging of the catalyst in the vertical distributing tubes. Small scale experiments subsequently performed bore out this observation. These experiments also indicated bridging in the downcomer pipes associated with the baffles and between the distributor and collector troughs extending from the beam ducts. In the conventional reactor and regenerator kiln these troughs in vertical cross section have a shape intermediate that of an inverted U and an inverted V. The purpose of this design, presumably, is to promote the flow of catalyst, and at the same time to reduce wear of the troughs. My experiments tended to demonstrate, however, that instead of promoting flow of the catalyst, the design of the troughs, whereby the sides of the channel formed by adjacent troughs slope initially inwardly toward each other, promoted bridging and hence intermittent and non-uniform flow.

In accordance with the present invention, I provide a reactor and a regenerating kiln for use in the catalytic cracking of hydrocarbons according to the moving catalyst bed principle, in which the bridging tendency of the catalyst is substantially reduced and uniformity and regularity of catalyst flow thus promoted.

My invention will be described with the aid of the accompanying drawings, which, although diagrammatic and conventional, are in general of scale proportions. In the drawings.

Figure 1:
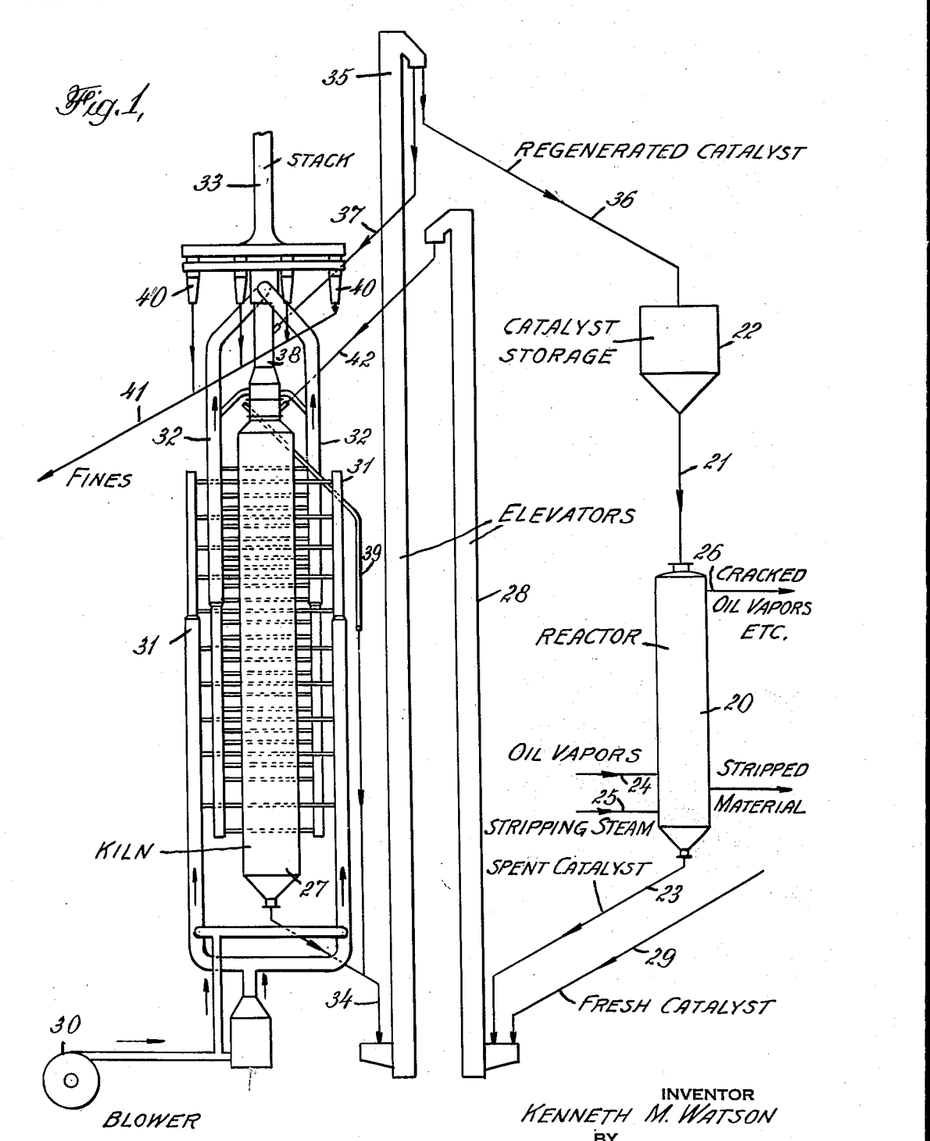
Fig. 1 is a flow diagram of a cracking system comprising a regenerating kiln and cracking reactor, each embodying my invention.
Figure 2:
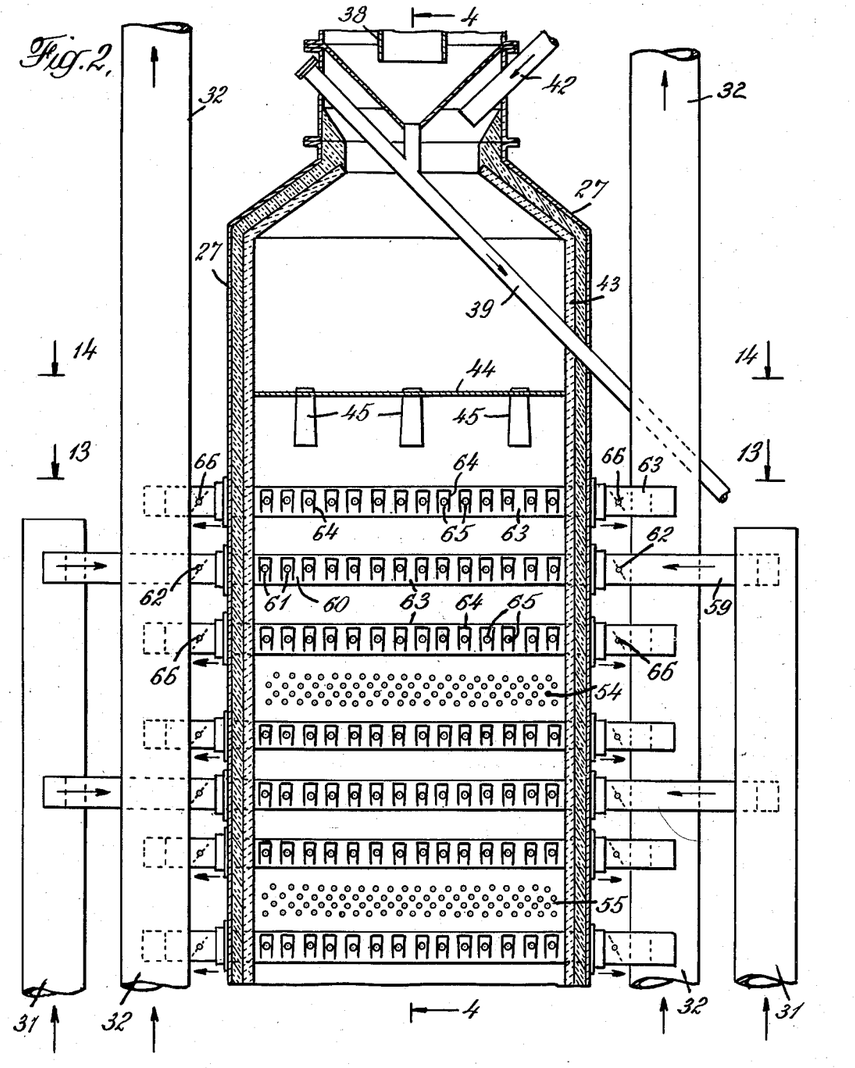
Figs. 2 and 3 are, respectively, enlarged sections of the upper and lower parts of the kiln in Fig. 1, sections on line 2—2 of Fig. 4, and line 3—3 of Fig. 5, respectively.
Figure 3:
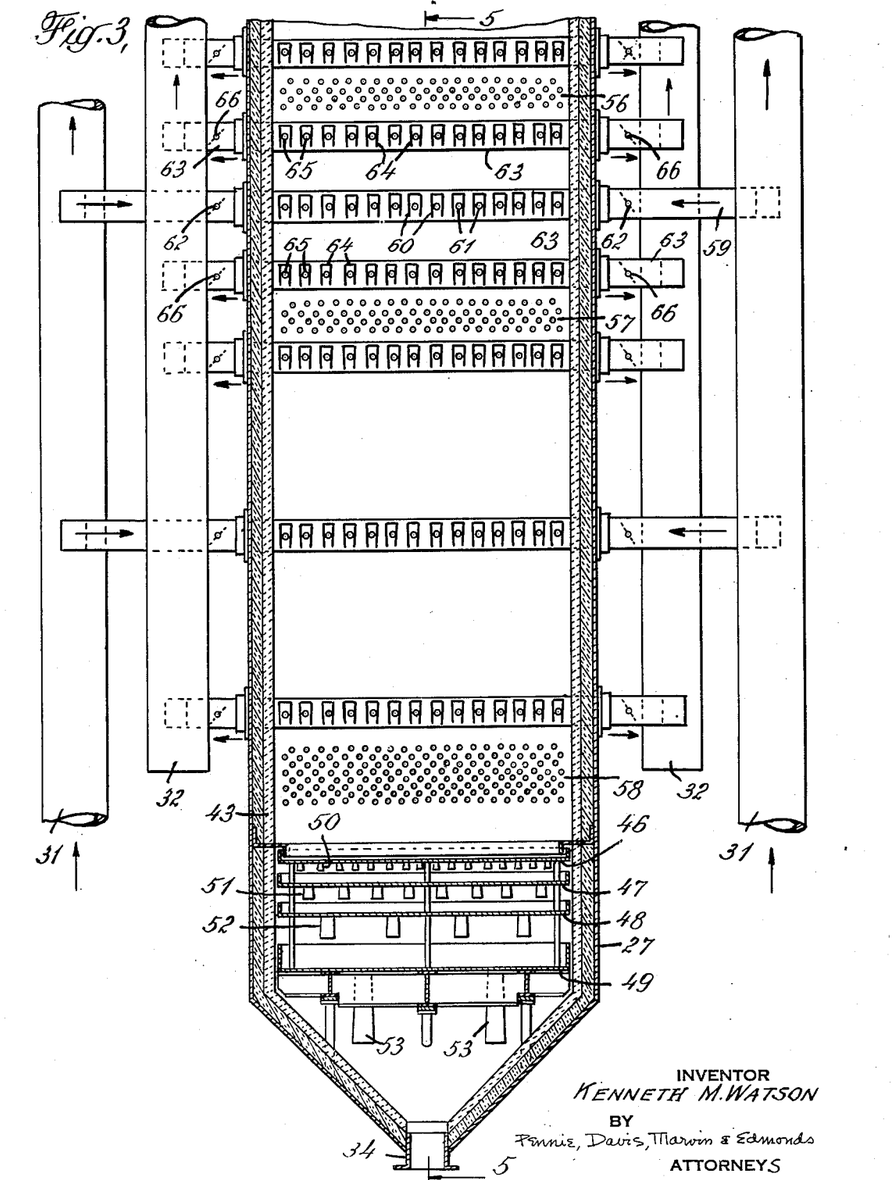

Referring to Fig. 1 as a diagram of the cracking operation as a whole: a charge of catalyst is maintained in a reactor 20, the regenerated catalyst being supplied from storage chamber 22 through connection 21 and spent catalyst being discharged through connection 23. The temperature in the reactor may approximate, for example, 900°–975° F. and the pressure in the reactor may approximate 6–10 lbs. per square inch gauge. Connection 21 is made long enough to serve as a seal. The hydrocarbons to be cracked are introduced into the reactor as a vapor mixture through connection 24. Steam to strip the spent catalyst leaving the reactor of vaporizable material is introduced through connection 25. The cracked hydrocarbons together with any uncracked material and the stripping steam leave the reactor as a vapor mixture through connection 26. Spent catalyst is lifted to the top of the kiln 27 by means of bucket elevator 28, entering the kiln through connection 42. Any fresh catalyst required to maintain the volume of catalyst in circulation in the system is introduced through connection 29 and lifted to the top of the kiln 27 by means of elevator 28 together with the spent catalyst. The catalyst moves downwardly through the kiln through a series of bodies in a corresponding series of zones through which air is blown by means of blower 30 and distributing ducts or manifolds 31 with appropriate connections to each of the several zones. The products of combustion escape from each of the several zones through ducts or manifolds 32, ultimately escaping through stack 33. The regenerated catalyst discharged from the lower end of the kiln through connection 34 is lifted to the top of bucket elevator 35. Part of the regenerated catalyst passes from the top of elevator 35 directly to chamber 22 through connection 36. Another part, 5%–10% of the total for example, passes through connection 37 to an elutriator 38. In this elutriator this diverted part of the regenerated catalyst falls through a rising stream of part of the gases passing to the stack, the fines being carried off with the gases and the coarser material returned through connection 39 to the foot of the elevator 35. In this manner the proportion of fines in the circulating catalyst can be kept within a chosen maximum. As a control, the proportion of the stack gases diverted through the elutriator can be varied or the proportion of the regenerated catalyst diverted to the elutriator can be varied. Before escaping through the stack 33 the products of combustion pass through a series of cyclone separators 40 in which fines carried out of the elutriator together with any fines carried out of the kiln proper are separated and discharged through connection 41. The kiln, the catalyst storage chamber, the reactor, the elevators and the several connections through which the catalyst passes are thermally insulated to minimize heat loss. By passing fresh catalyst through the kiln as it enters the system, such fresh catalyst is brought to the same temperature as the bulk of the circulating catalyst before it enters the catalyst storage chamber or the reactor.

Figure 4:
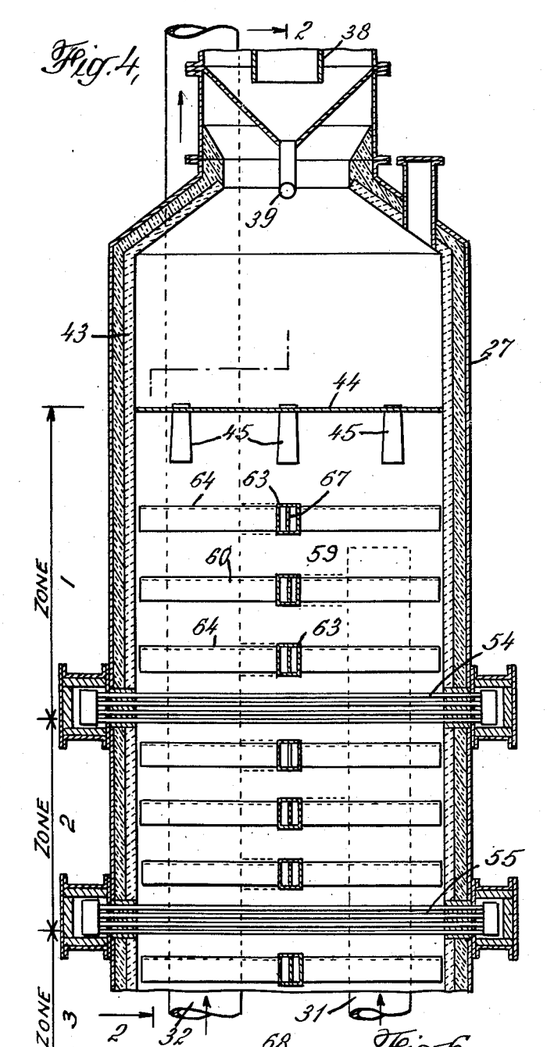
Figs. 4 and 5 are, respectively, enlarged sections of the upper and lower parts of the kiln in Fig. 1, the sections being taken on line 4—4 of Fig. 2, and on line 5—5 of Fig. 3, respectively.
Figures 5, 10, 11, 12:
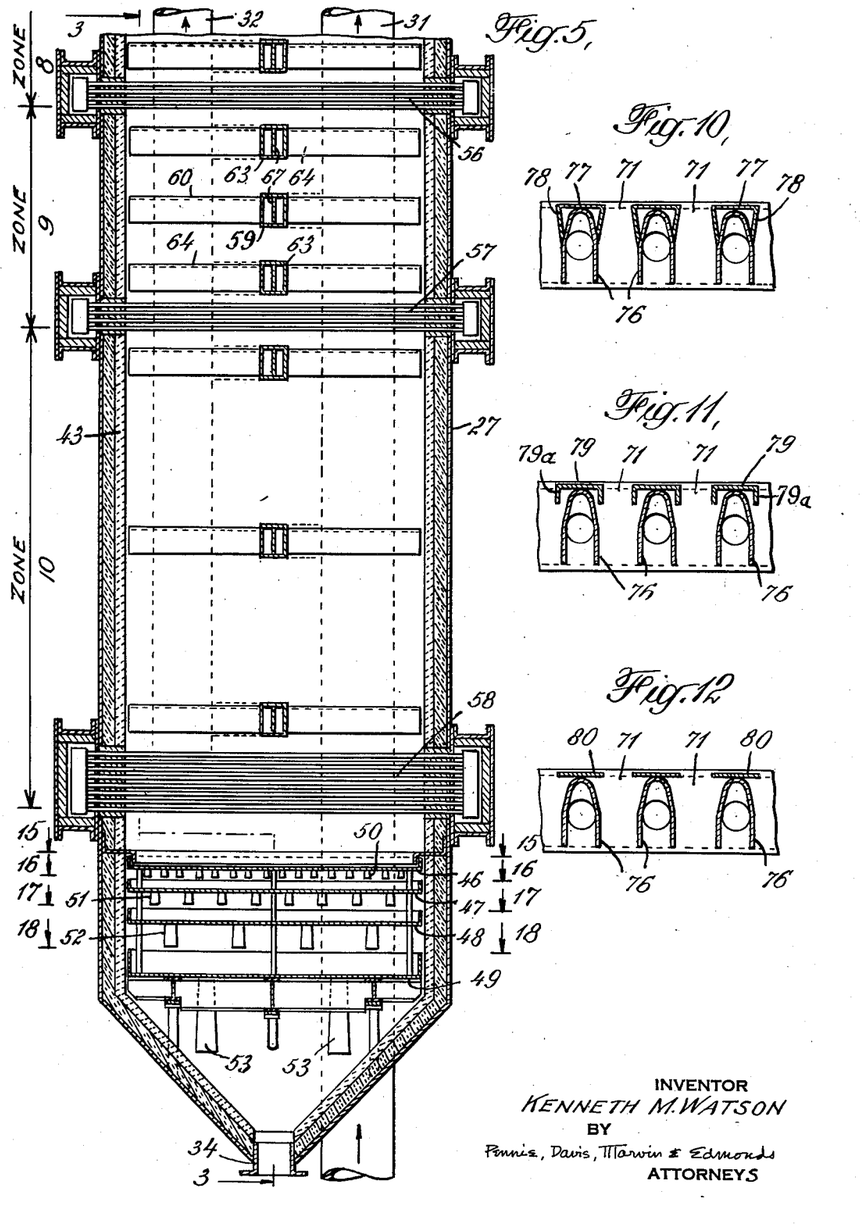
Figs. 10 to 12 inclusive are sections illustrating methods of modifying the conventional distributor or collector trough consistent with the invention.
Figure 6:
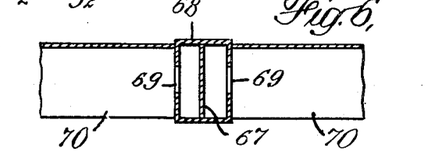
Fig. 6 is a fragmentary section of any of the beam ducts appearing in less detail in other figures—see particularly Figs. 4 and 5.
Figure 14:
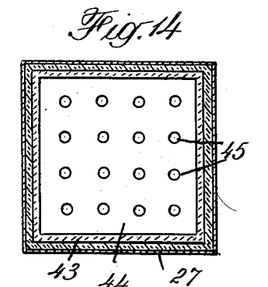
Fig. 14 is a reduced section on line 14—14 of Fig. 2.
Figure 15:
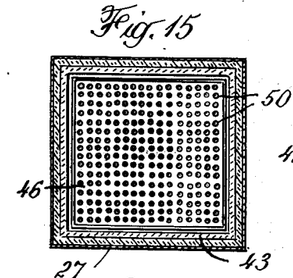
Figs. 15 to 18 are reduced sections taken on the lines 15—15, 16—16, 17—17 and 18—18, respectively, of Fig. 5.
Figure 16:
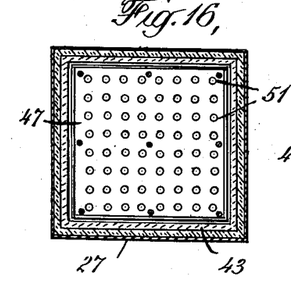
Figure 17:
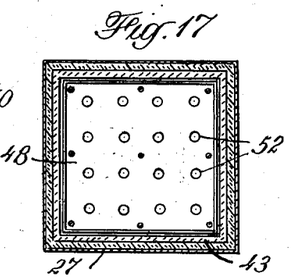
Figure 18:
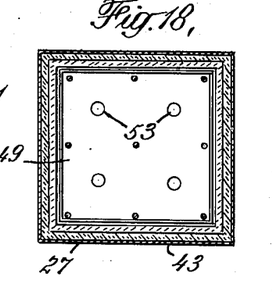

Referring now to Figs. 2 to 7 and 13 to 18, illustrating in greater detail a regenerating kiln embodying my invention: the kiln comprises a rectangular, thermally-insulated, and refractory-lined shell 43. To effect uniform distribution of the catalyst over a horizontal section of the kiln, a distributor plate or baffle 44, carrying distributing tubes 45, is arranged at the upper end of the kiln. To promote uniform flow of the catalyst downwardly through the kiln, a series of collector plates or baffles 46, 47, 48, and 49, each carrying appropriately arranged distributing tubes or downcomers 50, 51, 52, and 53, is provided in the lower part of the kiln. The arrangement of the apertures in the collector plates 46, 47, 48, and 49 is detailed in Figs. 15, 16, 17, and 18, respectively, while a plan view of the distributor plate 44, from which the tubes 45 depend, is provided by Fig. 14. As indicated by Fig. 14, the distributor plate preferably supports at least 9 tubes. In operation, the kiln, which is divided into zones, each of which is independent of the others for control purposes, by groups of horizontal tubes, through which a cooling medium is circulated, is maintained substantially full of catalyst between the lower ends of the distributor tubes 45 and the uppermost collector plate 46. Conventionally, the regenerator comprises 10 zones, numbered from top to bottom, delineated by 9 groups of tubes. In Figs. 2 to 5 only 4 of the zones are shown complete. Zone 1, as indicated, is the area above tube bundle 54 and below distributor plate 44. Zone 2 is delineated by tube bundles 54 and 55, zone 9 by tube bundles 56 and 57, and zone 10 by tube bundles 57 and 58. A grid consisting of a beam duct 59 and associated distributor troughs 60 is arranged centrally of each zone for introduction of air thereinto. Each of beam ducts 59 comprises apertures 61 allowing for passage of air from the duct to its associated distributor troughs, the air being supplied from manifold 31 connected to the ducts through dampers 62. For the collection of flue gases there is provided in each zone two grids, one below and one above the grid for air introduction, each of which, like the grid for air introduction comprises a beam duct 63 and associated troughs 64 communicating through passageways 65. Beam ducts 63 communicate with flue gas manifold 32 through dampers 66. A plan view of one of the grids for removing flue gases is provided by Fig. 13. In Fig. 6, illustrating in greater detail any of the beam ducts as shown in Figs. 4 and 5, the numeral 67 denotes a reinforcing web extending throughout the length of the beam duct indicated by the numeral 68. Passageways 69 allow for entry of air into the trough 70 or for the escape of flue gas from the trough, as the case may be.

It will be noted that in the zone nearest the bottom of the regenerating kiln the flue gas collector troughs are spaced further from the air distributor troughs than in the other zones, and also, that the body of catalyst in this zone is larger than in the other zones. In all other respects, however, such zone is identical with the other zones.

Figure 7:
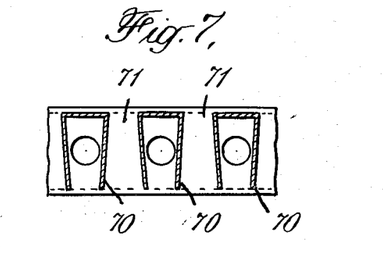
Fig. 7 is a fragmentary section of any three adjacent distributor or collector troughs appearing in less detail in other figures—see particularly Figs. 2 and 3.

Fig. 7 shows the channels 71 formed by adjacent distributor or collector troughs 70. Since the sides of the troughs slope inwardly, the channels are characterized in that their width progressively increases from top to bottom. I have found that very little bridging or hold-up of catalyst occurs in these channels as compared to channels the sides of which slope initially outwardly, as in the case of those formed by the conventional distributor and collector trough.

Figure 8:
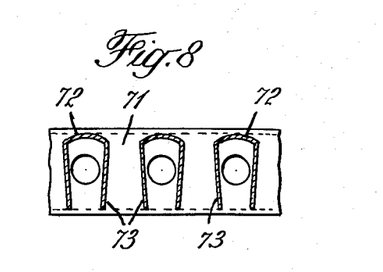
Figs. 8 and 9 illustrate alternative forms for the distributor and collector troughs.
Figure 9:
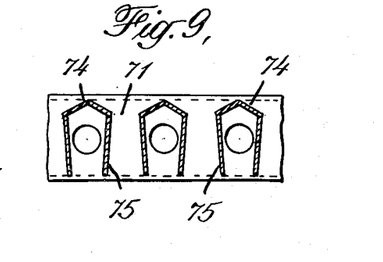
Figure 13:
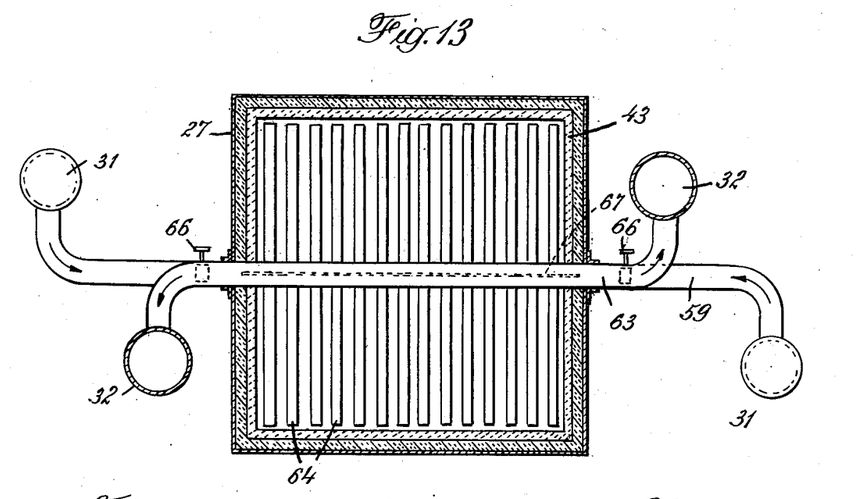
Fig. 13 is a section presenting a plan view of a beam duct, together with associated troughs, the section being taken on line 13—13 of Fig. 2.

Fig. 8 illustrates a modified form for the troughs. In such modification, the tops 72 of the troughs 73 are rounded to facilitate flow of catalyst and to reduce wear, particularly at the corners where the top and sides of the troughs join. Fig. 9 illustrates a further modified form for the troughs, substantially equivalent functionally to the modified form of Fig. 8. In this modification, the tops 74 of the troughs 75 instead of being rounded are gabled. If bridging of catalyst between gables is to be avoided the angle of inclination of the sides of the gables measured from the horizontal should not be greater than the angle of repose of the catalyst, similarly measured. Also, where the tops of the troughs are rounded as in Fig. 8, the degree of curvature should not be such as to promote bridging of catalyst between the rounded tops of adjacent troughs.

Figs. 10 to 12 illustrate how the conventional distributor and collector trough 76 may be modified in accordance with the invention to reduce hold-up of catalyst in the channels between adjacent troughs. In Fig. 10, a baffle 77 having inwardly sloping sides 78 is secured to the top of each trough. In Fig. 11, a baffle 79 having straight sides 79a is illustrated; while in Fig. 12 the baffle consists merely of a flat plate 80. Other modifications, not shown, will immediately occur to those skilled in the art.

While it is preferable to employ troughs like those illustrated in Figs. 7 to 9, I have discovered, as indicated by Figs. 10 to 12, that so long as the top portion of the trough, considering the baffles as part of the troughs in Figs. 10 to 12, is greater in width than the bottom or any intermediate portion, catalyst flow between the troughs will be smoother and more regular than where the top of the trough is of lesser width than some other portion of the trough, the bottom half, for example.

So as to prevent bridging or hold-up of catalyst in the vertical distributing tubes 45 in the upper part of the regenerating kiln (see Figs. 2, 4 and 14) and in the downcomers or distributing tubes 50, 51, 52, and 53 associated with the collector baffles 46, 47, 48, and 49 at the bottom of the regenerator (see Fig. 3 or 5), each of these is so constructed that its internal diameter progressively increases from top to bottom. I have determined that the flared tubes contribute greatly to uniformity and regularity of catalyst flow.

Figure 21:
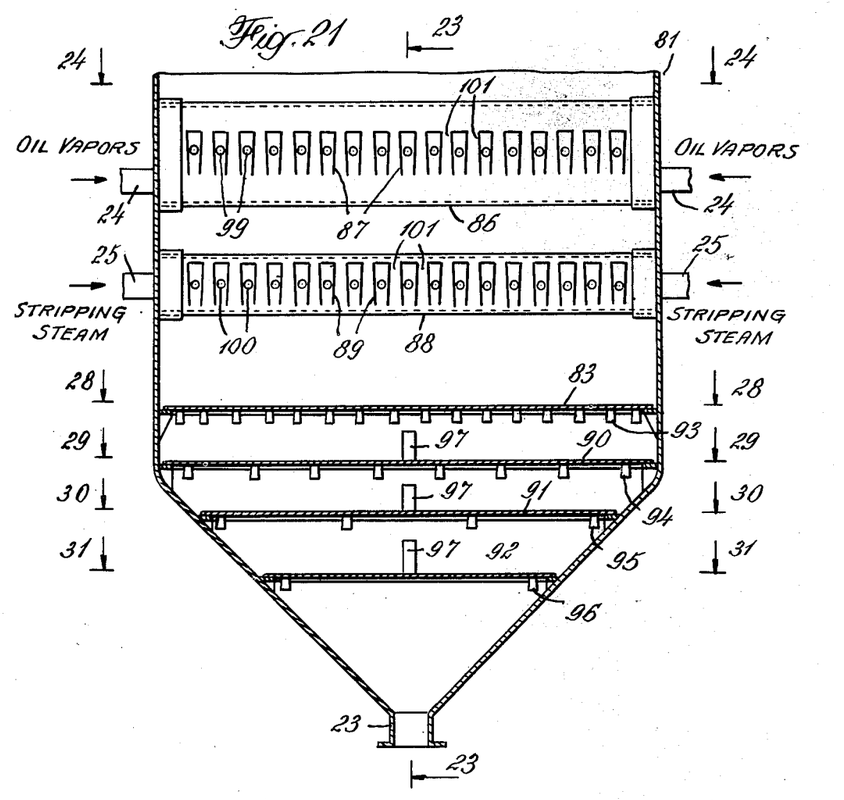
Fig. 21 is an enlarged section of the lower part of the reactor.
Figure 22:
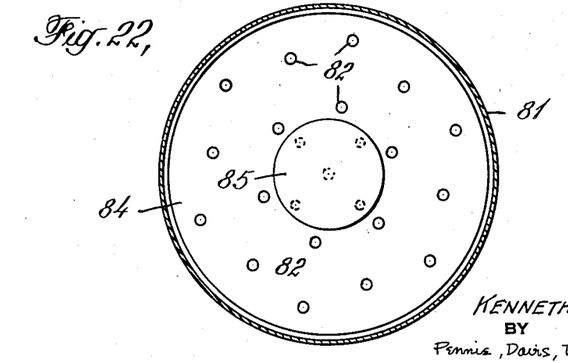
Fig. 22 is a section taken on line 22—22 of Fig. 20.
Figure 23:
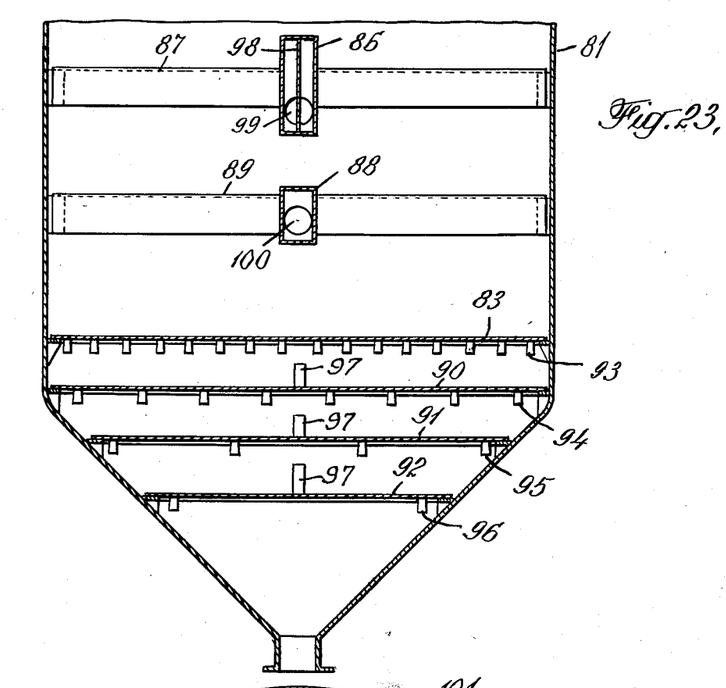
Fig. 23 is a section on line 23—23 of Fig. 21.
Figure 24:
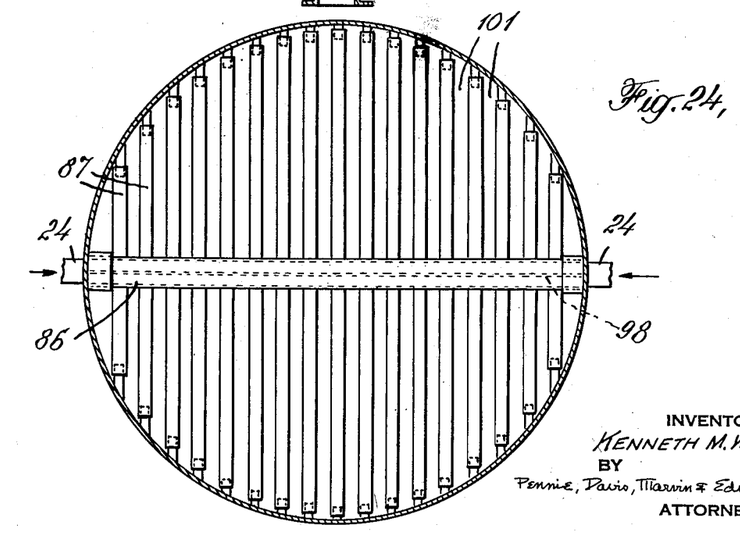
Fig. 24 is a section on line 24—24 of Fig. 21.
Figure 28:
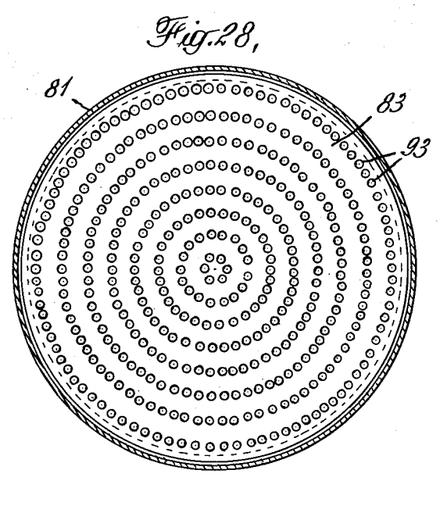
Figs. 28 to 31 are sections taken on the lines 28—28, 29—29, 30—30 and 31—31 of Fig. 21.
Figure 29:
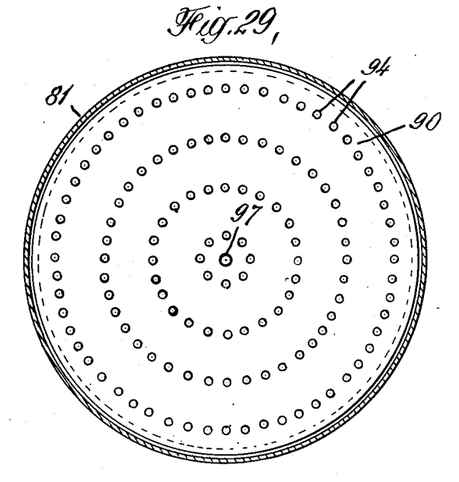
Figure 30:
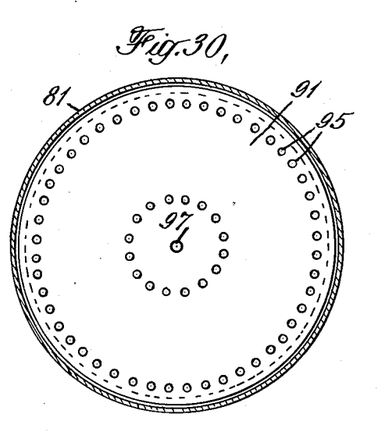
Figure 31:
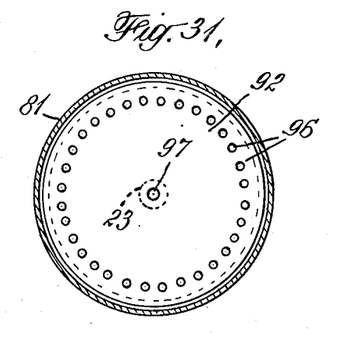

Referring to Figs. 19 to 31 as an illustration of a cracking reactor embodying my invention: the reactor comprises a cylindrical casing 81. Fresh catalyst or regenerated catalyst or a mixture of the two is charged into the upper end of the reactor through connection 21 and spent catalyst is discharged from the lower end of the reactor through connection 23, the reactor being maintained substantially full of catalyst between the lower ends of the flared distributing tubes 82 and the uppermost of the collector baffles, baffle 83, in the lower part of the reactor. A partition 84 separates the catalyst charging chamber in the upper part of the reactor from that region in the vessel in which the hydrocarbons to be cracked pass in contact with the catalyst. A baffle 85 beneath the discharge of connection 21 spreads the entering catalyst over this partition. The catalyst then flows through the flared distributing tubes 82 (see Fig. 22) into the region of reaction. As the charge of catalyst in the reactor, as the result of discharge through connection 23, moves away from the lower ends of these distributing tubes 82, additional catalyst immediately flows through the tubes keeping the lower ends of the tubes covered, the charge of catalyst in the reactor thus being automatically maintained. The distributing tubes 82 also assist in preventing the escape of hydrocarbons through the catalyst supply connections and provide free space above the charge of catalyst in the reactor for separation of any catalyst material entrained in the vapors. The hydrocarbons to be cracked are introduced into the reactor as a vapor mixture through connection 24, the beam duct 86 and the associated distributor troughs 87 (see Figs. 21, 23 and 24). Steam to strip the spent catalyst leaving the reactor of vaporizable material is introduced through connection 25, beam duct 88 and distributor troughs 89 (see Figs. 21 and 23). The cracked hydrocarbons together with any uncracked material and the stripping steam leave the reactor as a vapor mixture through connection 26. To promote uniform flow of the catalyst downwardly through the reactor, a series of collector baffles, including baffle 83, already mentioned supra, and baffles 90, 91 and 92, is provided in the lower part of the reactor. The arrangement on the baffles of the apertures corresponding to the distributing tubes 93, 94, 95 and 96 is shown by Figs. 28, 29, 30 and 31, respectively. These distributing tubes, like the distributing tubes associated with the collector baffles 46 to 49 in the regenerator, are of flared construction. A vent 97 is provided in each of the 3 lower baffles, the large number of downcomers opening through baffle 83 making the provision of such a vent in this baffle unnecessary.

Figures 19, 25, 26, 27:
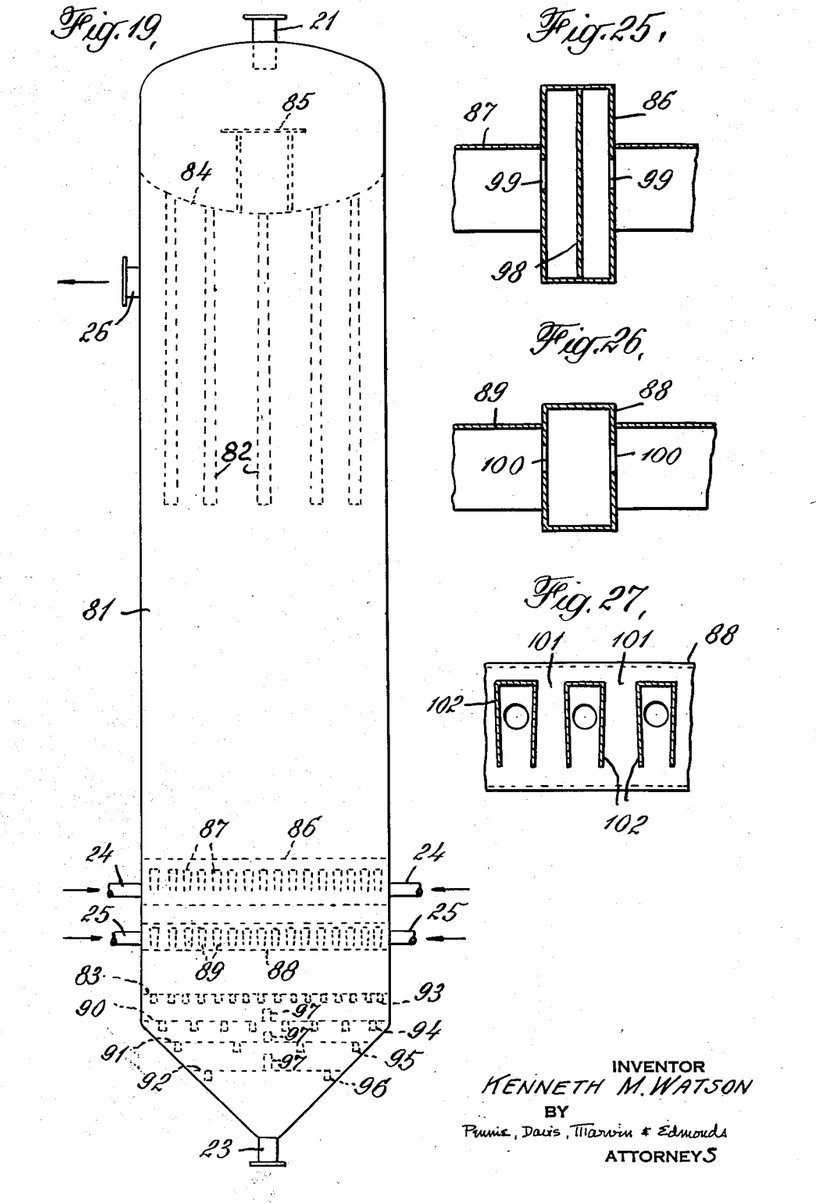
Fig. 19 is a sectional elevation of the reactor in Fig. 1.
Figs. 25 and 26 are fragmentary sections of the ducts appearing in less detail in other figures—see particularly Fig. 23.
Fig. 27 is a fragmentary section of any three adjacent oil vapor or steam distributor troughs in the reactor.
Figure 20:
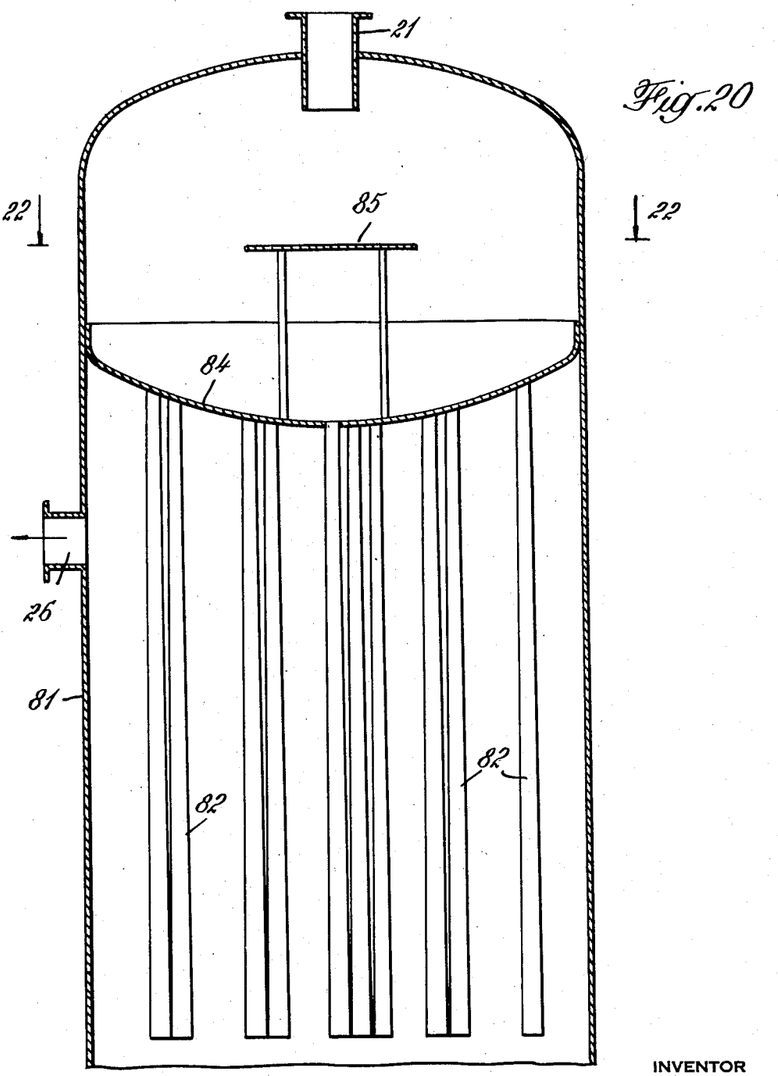
Fig. 20 is an enlarged section of the upper part of the reactor.

Reverting to the beam ducts and associated distributor troughs for introduction of oil vapor and steam into the reactor, it will be noted, as from Fig. 25, that the duct for oil vapor introduction, like the beam ducts in the regenerator, comprises a supporting web 98. Flow of oil vapor to the distributor trough 87 is through passageways 99. Similar passageways 100 are provided in the beam duct 88 through which steam is introduced into the reactor (Fig. 26). Distributor trough 89, communicating with beam duct 88 through passageways 100, may be louvered if desired. From Fig. 27 illustrating in vertical section any three adjacent distributor troughs in the reactor, it will be seen that the channels 101 formed by the troughs, indicated by the numeral 102, like the channels formed by the distributor and collector troughs in the regenerator, progressively increase in width from top to bottom. If desired, troughs with rounded or gabled tops, for example (see Figs. 8 and 9), may be used in the reactor, or conventional troughs which have been modified according to Figs. 10, 11 or 12, for example, may be used.

It will be apparent that the changes involved in applying my invention to a cracking reactor or a regenerating kiln are extremely simple. However, the results attained in use of my invention are not to be compared to these changes. My invention substantially improves uniformity and regularity of catalyst flowing through the region of reaction in catalytic cracking operations and accomplishes the improvements, in operation, resulting from more regular and more uniform catalyst flow.

I claim:

In a vessel of the character described for contacting a downwardly moving bed of granular type catalyst with aeriform fluids, a granular catalyst distributing plate horizontally mounted in the upper end of said vessel, spaced granular catalyst downcomer pipes depending from said plate, said pipes being tapered outwardly from top to bottom to provide flared flow conduits of increasing size capable of insuring uninterrupted granular catalyst flow without clogging, a series of granular catalyst collecting baffles mounted at spaced intervals at the lower end of said vessel, each of said baffles having spaced downcomer pipes depending therefrom and tapered outwardly from top to bottom to insure uninterrupted granular catalyst flow without clogging, a series of vertically spaced horizontally disposed gas ducts mediate the distributing plate and the uppermost catalyst collecting baffle, each of said gas ducts having holes along its length, a series of closely spaced horizontally extending inverted troughs mounted along the length of each of said gas ducts transversely thereof, said inverted troughs each having a top wall and opposed depending flat side walls, said top wall extending upwardly from the upper edges of said side walls to a degree such that the angle of inclination of the top wall measured from the horizontal is no greater than the angle of repose of the granular catalyst similarly measured to avoid catalyst bridging between adjacent trough top walls, the inclination of the top walls preventing significant accumulation of stagnant catalyst, said side walls of each trough having their lower ends closer to each other than their upper ends to define vertical channels between adjacent troughs having a progressively increasing width from top to bottom to avoid catalyst bridging between adjacent trough side walls.

KENNETH M. WATSON.

REFERENCES CITED

The following references are of record in the file of this patent:

UNITED STATES PATENTS

| Number | Name | Date |
|---|---|---|
| 158,166 | Colwell | Dec. 29, 1874 |
| 1,685,338 | Randolph | Sept. 25, 1928 |
| 2,156,591 | Jacobson | May 2, 1939 |
| 2,337,684 | Scheineman | Dec. 28, 1943 |
| 2,350,644 | Simpson et al. | June 6, 1944 |
| 2,386,670 | Evans | Oct. 9, 1945 |
| 2,412,136 | Evans et al. | Dec. 3, 1946 |
| 2,418,673 | Sinclair et al. | Apr. 8, 1947 |
| 2,423,411 | Simpson | July 1, 1947 |
| 2,495,786 | Strader | Jan. 31, 1950 |